(12) United States Patent
Hayashi et al.

(10) Patent No.: US 12,535,805 B2
(45) Date of Patent: Jan. 27, 2026

(54) LINE DESIGNING DEVICE AND LINE DESIGNING METHOD

(71) Applicant: Hitachi, Ltd., Tokyo (JP)

(72) Inventors: Naohiro Hayashi, Tokyo (JP); Takahiro Iwata, Tokyo (JP); Hiroshi Homma, Tokyo (JP); Daiki Kajita, Tokyo (JP)

(73) Assignee: Hitachi, Ltd., Tokyo (JP)

(*) Notice: Subject to any disclaimer, the term of this patent is extended or adjusted under 35 U.S.C. 154(b) by 373 days.

(21) Appl. No.: 18/034,734

(22) PCT Filed: Oct. 14, 2021

(86) PCT No.: PCT/JP2021/038024
§ 371 (c)(1),
(2) Date: May 1, 2023

(87) PCT Pub. No.: WO2022/172508
PCT Pub. Date: Aug. 18, 2022

(65) Prior Publication Data
US 2023/0400843 A1    Dec. 14, 2023

(30) Foreign Application Priority Data
Feb. 10, 2021   (JP) ................. 2021-019542

(51) Int. Cl.
G05B 19/418    (2006.01)
(52) U.S. Cl.
CPC .......... *G05B 19/41885* (2013.01); *G05B 2219/31343* (2013.01)
(58) Field of Classification Search
CPC .... G05B 19/41885; G05B 2219/31343; G05B 19/4188; G05B 2219/31338; Y02P 90/02
See application file for complete search history.

(56) References Cited

U.S. PATENT DOCUMENTS

2003/0225555 A1* 12/2003 Gurumoorthy ......... G06F 30/00
703/9
2004/0236547 A1* 11/2004 Rappaport ........... G06Q 10/087
703/2

(Continued)

FOREIGN PATENT DOCUMENTS

EP    3 936 953 A1    1/2022
EP    3 937 113 A1    1/2022

(Continued)

OTHER PUBLICATIONS

International Search Report (PCT/ISA/210) issued in PCT Application No. PCT/JP2021/038024 dated Dec. 28, 2021 with English translation (four (4) pages).

(Continued)

*Primary Examiner* — Ziaul Karim
(74) *Attorney, Agent, or Firm* — Crowell & Moring LLP

(57) ABSTRACT

A line designing device including a calculation unit and a storage unit, in which the storage unit holds facility information indicating a specification of each module, process design information indicating a component for manufacturing a product, work on the component, and a module used for the work, standard module information indicating a type of each of the modules and another module attachable thereto, and inter-module connection information indicating a connection specification between the modules, the module includes at least one of a facility and a device used for the work, and the calculation unit generates line configuration information identifying the module constituting a manufacturing line for manufacturing the product and connection between the modules based on the facility information, the process design information, the standard module information, and the inter-module connection information, and outputs information indicating a module constituting the (Continued)

manufacturing line and connection between the modules based on the line configuration information.

9 Claims, 15 Drawing Sheets

(56) References Cited

U.S. PATENT DOCUMENTS

| | | | | |
|---|---|---|---|---|
| 2006/0105249 A1* | 5/2006 | Kushida | .................... | G03F 1/36 430/30 |
| 2008/0058969 A1* | 3/2008 | Nixon | ................ | G05B 19/0426 700/87 |
| 2008/0297847 A1* | 12/2008 | Yamazaki | ............... | G06F 30/00 358/1.15 |
| 2011/0224828 A1* | 9/2011 | Breznak | ................. | B25J 9/1605 700/264 |
| 2013/0271595 A1* | 10/2013 | Hiroi | .................. | G01N 23/2251 348/80 |
| 2013/0293530 A1* | 11/2013 | Perez | ................. | G06Q 30/0251 345/418 |
| 2013/0326439 A1* | 12/2013 | Matsuoka | .............. | G01B 15/04 716/55 |
| 2014/0163933 A1* | 6/2014 | Ishibashi | .......... | G05B 19/41885 703/1 |
| 2016/0314085 A1* | 10/2016 | Ware | .................... | G06F 13/1673 |
| 2017/0221871 A1* | 8/2017 | Sheridan | ............. | H01L 25/0655 |
| 2017/0308067 A1* | 10/2017 | Lamparter | ......... | G05B 19/4183 |
| 2019/0146465 A1* | 5/2019 | Tsutsumi | .......... | G05B 19/41865 700/98 |
| 2019/0179290 A1* | 6/2019 | Yoshida | ............. | G05B 19/4155 |
| 2020/0159194 A1* | 5/2020 | Katsumata | ......... | G05B 19/4189 |

FOREIGN PATENT DOCUMENTS

| | | |
|---|---|---|
| JP | 2007-172286 A | 7/2007 |
| JP | 2010-55220 A | 3/2010 |
| JP | 2017-535875 A | 11/2017 |
| JP | 2019-8715 A | 1/2019 |
| WO | WO 2020/178933 A1 | 9/2020 |
| WO | WO 2020/178937 A1 | 9/2020 |

OTHER PUBLICATIONS

Japanese-language Written Opinion (PCT/ISA/237) issued in PCT Application No. PCT/JP2021/038024 dated Dec. 28, 2021 (three (3) pages).

* cited by examiner

FIG. 4

| DEVICE NAME | MANUFACTURER | POWER SUPPLY CONNECTION | COMMUNICATION CONNECTION | LOAD CAPACITY | OUTER SHAPE | OPERATION SPEED |
|---|---|---|---|---|---|---|
| ARM ROBOT A | MANUFACTURED BY ○○ | 200V | IO LINE, USB | 3kg | 1.5m | 0.8m/s |
| ARM ROBOT B | MANUFACTURED BY ○○ | 200V | IO LINE, USB | 5kg | 1.5m | 1m/s |
| INSPECTION ROBOT A | MANUFACTURED BY ○○ | 200V | Ethernet | - | 1.5m | 0.5m/s |
| CONVEYOR A | MANUFACTURED BY □□ | 200V | Ethernet | 100kg | 3m | 0.5m/s |
| CONVEYOR B | MANUFACTURED BY □□ | 200V | Ethernet | 100kg | 2m | 0.3m/s |
| SUCTION HAND A | MANUFACTURED BY △△ | 20V | USB | 3kg | 0.2m | 0.1m/s |
| OPENING AND CLOSING HAND A | MANUFACTURED BY △△ | 20V | USB | 5kg | 0.2m | - |
| FEEDER A | MANUFACTURED BY △△ | 100V | IO LINE | - | 0.5m | - |
| FEEDER B | MANUFACTURED BY △△ | 100V | IO LINE | - | 0.5m | - |
| ⋮ | | | | | | |

FIG. 5

| PROCESS No | WORK NAME | COMPONENT NAME | ROBOT | TOOL | COMPONENT SUPPLY | CONVEYANCE | TABLE | OPTION |
|---|---|---|---|---|---|---|---|---|
| 1 | ASSEMBLING A | BASE COMPONENT | ARM ROBOT A | SUCTION HAND A | FEEDER A | CONVEYOR A | AUTOMATIC ASSEMBLY TABLE A | — |
| 1 | ASSEMBLING B | METAL COMPONENT A | ARM ROBOT A | OPENING AND CLOSING HAND A | FEEDER B | CONVEYOR A | AUTOMATIC ASSEMBLY TABLE A | ROBOT CAMERA |
| 2 | ASSEMBLING B | FLEXIBLE OBJECT COMPONENT B | ARM ROBOT B, WORKER A | OPENING AND CLOSING HAND B | FEEDER C | CONVEYOR A | MANUAL-AUTOMATIC ASSEMBLY TABLE B | — |
| 3 | SCREWING A | 10mm M4 SCREW | ARM ROBOT C | M4 DRIVER A | FEEDER D | CONVEYOR A | AUTOMATIC ASSEMBLY TABLE C | — |
| 3 | SCREWING A | 15mm M4 SCREW | ARM ROBOT C | M4 DRIVER A | FEEDER E | CONVEYOR A | AUTOMATIC ASSEMBLY TABLE C | — |
| 3 | SCREWING A | 10mm M5 SCREW | ARM ROBOT D | M5 DRIVER B | FEEDER F | CONVEYOR A | AUTOMATIC ASSEMBLY TABLE C | — |
| 4 | APPEARANCE INSPECTION A | — | APPEARANCE INSPECTION ROBOT A | | — | CONVEYOR A | — | — |
| 5 | INSPECTION A | — | WORKER A | | — | CONVEYOR A | MANUAL ASSEMBLY TABLE A | — |

FIG. 8

| MODULE TYPE NAME | DEVICE NAME | ROBOT | ROBOT | TOOL | TOOL | COMPONENT SUPPLY | CONVEYANCE | ASSEMBLY TABLE | OPTION | OPTION |
|---|---|---|---|---|---|---|---|---|---|---|
| | DEVICE NAME | ARM | SCARA | OPENING AND CLOSING HAND | SUCTION HAND | FEEDER | CONVEYOR | AUTOMATIC ASSEMBLY TABLE | POSITION SENSOR | CAMERA |
| ROBOT | ARM | | | | | | | | | |
| ROBOT | SCARA | ROBOT PEDESTAL | | | | | | | | |
| TOOL | OPENING AND CLOSING HAND | TOOL CHANGER | TOOL CHANGER | | | | | | | |
| TOOL | SUCTION HAND | TOOL CHANGER | TOOL CHANGER | — | | | | | | |
| COMPONENT SUPPLY | FEEDER | ROBOT PEDESTAL | ROBOT PEDESTAL | — | — | | | | | |
| CONVEYANCE | CONVEYOR | ROBOT PEDESTAL | ROBOT PEDESTAL | — | — | — | | | | |
| ASSEMBLY TABLE | AUTOMATIC ASSEMBLY TABLE | ROBOT FIXING PLATE | ROBOT FIXING PLATE | HAND FOLDER | HAND FOLDER | HAND FOLDER | FLANGE | | | |
| OPTION | POSITION SENSOR | SENSOR FIXING PLATE | SENSOR FIXING PLATE | SENSOR FIXING PLATE | SENSOR FIXING PLATE | SENSOR FIXING PLATE | SENSOR FIXING PLATE | SENSOR FIXING PLATE | | |
| OPTION | CAMERA | SENSOR FIXING PLATE | SENSOR FIXING PLATE | SENSOR FIXING PLATE | SENSOR FIXING PLATE | SENSOR FIXING PLATE | SENSOR FIXING PLATE | SENSOR FIXING PLATE | — | |

FIG. 9

| MODULE TYPE NAME | DEVICE NAME | ROBOT | ROBOT | TOOL | TOOL | COMPONENT SUPPLY | CONVEYANCE | ASSEMBLY TABLE | OPTION | OPTION |
|---|---|---|---|---|---|---|---|---|---|---|
| | | ARM | SCARA | OPENING AND CLOSING HAND | SUCTION HAND | FEEDER | CONVEYOR | AUTOMATIC ASSEMBLY TABLE | POSITION SENSOR | CAMERA |
| ROBOT | ARM | | - | IO LINE | IO LINE | IO LINE | Ethernet | - | USB | USB |
| ROBOT | SCARA | - | | IO LINE | IO LINE | IO LINE | Ethernet | - | USB | USB |
| TOOL | OPENING AND CLOSING HAND | IO LINE | IO LINE | | - | - | - | - | - | - |
| TOOL | SUCTION HAND | IO LINE | IO LINE | - | | - | - | - | - | - |
| COMPONENT SUPPLY | FEEDER | IO LINE | IO LINE | - | - | | - | - | IO LINE | - |
| CONVEYANCE | CONVEYOR | Ethernet | Ethernet | - | - | - | | - | IO LINE | - |
| ASSEMBLY TABLE | AUTOMATIC ASSEMBLY TABLE | - | - | - | - | - | - | | IO LINE | - |
| OPTION | POSITION SENSOR | USB | USB | - | - | - | - | - | | - |
| OPTION | CAMERA | USB | USB | - | - | - | - | - | - | |

FIG. 10

| MODULE TYPE NAME | MODULE DEVICE NAME | OPTION | MODULE PHYSICAL CONNECTION DESTINATION | PHYSICAL CONNECTION | MODULE COMMUNICATION CONNECTION DESTINATION | COMMUNICATION CONNECTION | POWER SUPPLY CONNECTION | CHANGE SOFTWARE | LOAD CAPACITY | OUTER SHAPE |
|---|---|---|---|---|---|---|---|---|---|---|
| ROBOT | ARM ROBOT A | | WORK TABLE | ROBOT PEDESTAL | SUCTION HAND A, OPENING AND CLOSING HAND A | IO LINE, IO LINE | 200V | – | 3kg | 1.5m |
| | /ARM ROBOT A | CAMERA | ARM ROBOT A | SENSOR CONNECTOR | ARM ROBOT A | USB | 20V | – | – | 0.2m |
| /ROBOT TOOL | SUCTION HAND A | | ARM ROBOT A, WORK TABLE | TOOL CHANGER, HAND FOLDER | ARM ROBOT A | IO LINE | 100V | – | 3kg | 0.2m |
| | OPENING AND CLOSING HAND A | | ARM ROBOT A, WORK TABLE | TOOL CHANGER, HAND FOLDER | ARM ROBOT A | IO LINE | 100V | – | 5kg | 0.2m |
| /TOOL COMPONENT SUPPLY | FEEDER A | | WORK TABLE | FEEDER PEDESTAL | ARM ROBOT A | IO LINE | 100V | – | – | 0.5m |
| | FEEDER B | | WORK TABLE | FEEDER PEDESTAL | ARM ROBOT A | IO LINE | 100V | – | – | 0.5m |
| /COMPONENT SUPPLY CONVEYANCE | CONVEYOR A | | WORK TABLE | CLAMP | Ethernet | Ethernet | 200V | – | 100kg | 3m |
| /CONVEYANCE ASSEMBLY TABLE | AUTOMATIC ASSEMBLY TABLE A | | ARM ROBOT A, SUCTION HAND, OPENING AND CLOSING HAND, FEEDER A, FEEDER B | ROBOT PEDESTAL, HAND FOLDER, HAND FOLDER, FEEDER PEDESTAL, FEEDER PEDESTAL | | – | – | – | – | 2m |
| /ASSEMBLY TABLE | | | | | | | | | | |

FIG. 15

| MODULE TYPE NAME | DEVICE NAME | ROBOT | ROBOT | TOOL | TOOL | COMPONENT SUPPLY | CONVEYANCE | ASSEMBLY TABLE | OPTION | OPTION |
| --- | --- | --- | --- | --- | --- | --- | --- | --- | --- | --- |
| | | ARM | SCARA | OPENING AND CLOSING HAND | SUCTION HAND | FEEDER | CONVEYOR | AUTOMATIC ASSEMBLY TABLE | POSITION SENSOR | CAMERA |
| ROBOT | ARM | | | | | | | | | |
| ROBOT | SCARA | ROBOT PROGRAM | | | | | | | | |
| TOOL | OPENING AND CLOSING HAND | ROBOT PROGRAM | ROBOT PROGRAM | | | | | | | |
| TOOL | SUCTION HAND | ROBOT PROGRAM | ROBOT PROGRAM | – | | | | | | |
| COMPONENT SUPPLY | FEEDER | ROBOT PROGRAM | ROBOT PROGRAM | – | – | | | | | |
| CONVEYANCE | CONVEYOR | LADDER PROGRAM | LADDER PROGRAM | – | – | – | | | | |
| ASSEMBLY TABLE | AUTOMATIC ASSEMBLY TABLE | ROBOT PROGRAM | ROBOT PROGRAM | – | – | – | – | | | |
| OPTION | POSITION SENSOR | ROBOT PROGRAM | ROBOT PROGRAM | – | – | – | – | – | | |
| OPTION | CAMERA | ROBOT PROGRAM | ROBOT PROGRAM | – | – | – | – | – | – | |

LINE DESIGNING DEVICE AND LINE DESIGNING METHOD

INCORPORATION BY REFERENCE

This application claims priority to Japanese Patent Application No. 2021-19542 filed on Feb. 10, 2021, the contents of which are incorporated herein by reference.

TECHNICAL FIELD

The present invention relates to a design technique of a manufacturing line.

BACKGROUND ART

In the manufacturing industry, a production mode for manufacturing a wide variety of products is required, and a line whose configuration can be flexibly changed is required. In recent years, in order to cope with changes in production environment such as a natural disaster and a disease, flexibility of a line has become more important, such as reconstruction of a production system between a plurality of bases and switching from manpower to an automated facility.

As a method of reconstructing a line in accordance with a change in a manufacturing product, PTL 1 discloses a method in which a predetermined number of devices having a function of executing element work shared in each process in a line are prepared, and a line configuration is automatically generated on the basis of recombination of the devices.

CITATION LIST

Patent Literature

PTL 1: JP 2010-55220 A

SUMMARY OF INVENTION

Technical Problem

In a system of PTL 1, a line is expressed in units of processes, and a detailed device configuration constituting a process and a function of each device are not expressed. For this reason, at the time of line recombination, a change in a device configuration due to a process change cannot be expressed by this expression method. Further, physical and electrical connection specifications for connecting each device necessary at the time of line construction are not described.

The present invention has been made in view of the above circumstances, and an object of the present invention is to provide a line designing device that defines a device (for example, a robot, a tool, a conveyance machine, or a component supply machine) having a specific function as a module, describes a configuration of a manufacturing line in units of modules that can be recombined, and provides connection information between modules, so as to achieve reduction in the number of man-hours for line designing at the time of line construction and reconstruction.

Solution to Problem

In order to solve the above problem, for example, the configuration described in the claims is employed. The present application includes a plurality of means for solving the above problem. An example is a line designing device including a calculation unit and a storage unit. The storage unit holds facility information indicating a specification of each module, process design information indicating a component for manufacturing a product, work on the component, and a module used for the work, standard module information indicating a type of each of the modules and another module attachable thereto, and inter-module connection information indicating a connection specification between the modules, the module includes at least one of a facility and a device used for the work, and the calculation unit generates line configuration information identifying the module constituting a manufacturing line for manufacturing the product and connection between the modules based on the facility information, the process design information, the standard module information, and the inter-module connection information, and outputs information indicating a module constituting the manufacturing line and connection between the modules based on the line configuration information.

Advantageous Effects of Invention

According to one aspect of the present invention, a line configuration can be described and changed in units of modules, and it is possible to reduce line design man-hours at the time of line construction and reconstruction.

An object, a configuration, and an advantageous effect other than those described above will be clarified in description of an embodiment described below.

BRIEF DESCRIPTION OF DRAWINGS

FIG. 4 is an explanatory diagram illustrating an example of facility information according to the embodiment of the present invention.

FIG. 5 is an explanatory diagram illustrating an example of process design information according to the embodiment of the present invention.

FIG. 8 is an explanatory diagram illustrating an example of inter-standard module physical connection information according to the embodiment of the present invention.

FIG. 9 is an explanatory diagram illustrating an example of inter-standard module communication connection information according to the embodiment of the present invention.

FIG. 10 is an explanatory diagram illustrating an example of line configuration information for one process according to the embodiment of the present invention.

FIG. 15 is an explanatory diagram illustrating an example of standard module software change relationship information according to the embodiment of the present invention.

DESCRIPTION OF EMBODIMENTS

Hereinafter, a line designing device according to the present invention will be described based on an embodiment with reference to the drawings.

Figure 1:
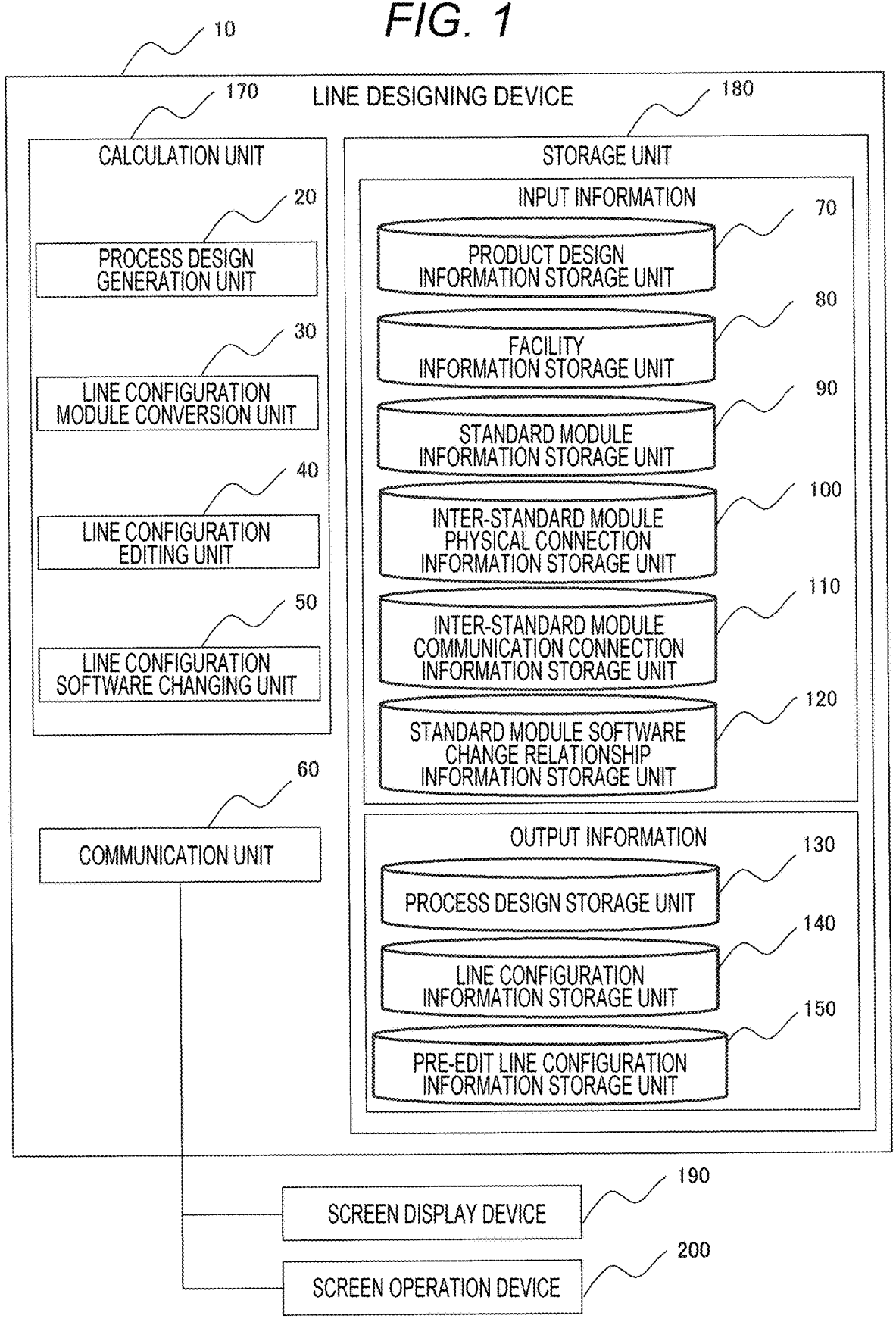
FIG. 1 is a block diagram illustrating an overall configuration of a line designing device according to an embodiment of the present invention.

FIG. 1 is a block diagram illustrating an overall configuration of the line designing device according to an embodiment of the present invention.

As illustrated in FIG. 1, a line designing device 10 includes a process design generation unit 20, a line configuration module conversion unit 30, a line configuration editing unit 40, a line configuration software changing unit 50, a communication unit 60, a product design information storage unit 70, a facility information storage unit 80, a standard module information storage unit 90, an inter-standard module physical connection information storage unit 100, an inter-standard module communication connection information storage unit 110, a standard module software change relationship information storage unit 120, a process design storage unit 130, a line configuration information storage unit 140, and a pre-edit line configuration information storage unit 150.

The process design generation unit 20 generates a process design of a line from product design information. The line configuration module conversion unit 30 converts a process design into line configuration information described in units of modules including connection information between modules. The line configuration editing unit 40 displays line configuration information on a screen and makes the line configuration information editable on the screen. The line configuration software changing unit 50 performs software change accompanying a line configuration change, and describes a changed portion in line configuration information. The communication unit 60 is connected to a screen display device 190 and a screen operation device 200.

The product design information storage unit 70 stores design information of a product to be produced. The facility information storage unit 80 stores specification information of a facility to be used. The standard module information storage unit 90 stores a module type of a facility. The inter-standard module physical connection information storage unit 100 stores physical connection specifications between modules. The inter-standard module communication connection information storage unit 110 stores communication connection specifications between modules. The standard module software change relationship information storage unit 120 stores information on software to be changed at the time of module change. The process design storage unit 130 stores process design information. The line configuration information storage unit 140 stores a line configuration described by modules. The pre-edit line configuration information storage unit 150 stores a pre-edit line configuration.

The line designing device 10 may be realized by, for example, a computer including a calculation unit 170, a storage unit 180, and the communication unit 60. In this example, the calculation unit 170 is a processor that executes a program stored in the storage unit 180. The process design generation unit 20, the line configuration module conversion unit 30, the line configuration editing unit 40, and the line configuration software changing unit 50 are implemented by the calculation unit 170 executing a program.

Further, the storage unit 180 includes, for example, a main storage device such as a DRAM and an auxiliary storage device such as a hard disk drive or an SSD, and stores a program executed by the calculation unit 170, data used for processing of the calculation unit 170, and the like. The product design information storage unit 70, the facility information storage unit 80, the standard module information storage unit 90, the inter-standard module physical connection information storage unit 100, the inter-standard module communication connection information storage unit 110, the standard module software change relationship information storage unit 120, the process design storage unit 130, the line configuration information storage unit 140, and the pre-edit line configuration information storage unit 150 are storage regions in the storage unit 180.

The screen display device 190 may be a device included in a computer that implements the line designing device 10, or may be a device included in another computer that communicates with a computer that implements the line designing device. The screen operation device 200 includes a device for inputting information, such as a keyboard, a mouse, or a touch sensor. The screen operation device 200 may be a device included in a computer that implements the line designing device 10, or may be a device included in another computer that communicates with a computer that implements the line designing device. Further, the screen operation device 200 may be integrated with a screen display device, for example, like what is called a touch panel.

Figure 2:
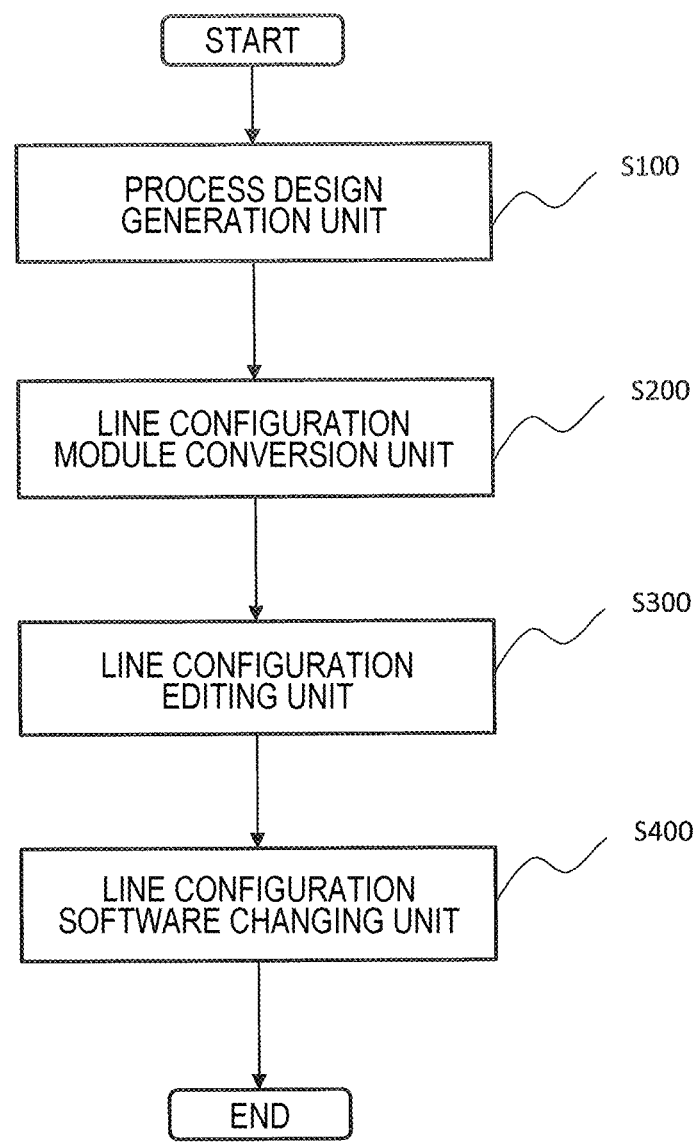
FIG. 2 is a flowchart illustrating a process of processing in the line designing device according to the embodiment of the present invention.

FIG. 2 is a flowchart illustrating a process of processing in the line designing device 10 according to the embodiment of the present invention. Hereinafter, a process of processing in the line designing device 10 will be described with reference to FIGS. 1 and 2.

<Process Design Generation Unit>

In a first procedure illustrated in FIG. 2, when the line designing device 10 is executed, process design processing is started, and the process design generation unit 20 generates process design information from product design information describing a design of a product to be produced (Step S100).

When designing a process for producing a product, the process design generation unit 20 can automatically generate a process design in which process division in consideration of a line balance to be described later, determination of a processing device and a conveyance device necessary for each process, and the like are performed. For this reason, process design man-hours of the user can be reduced.

Figure 3:
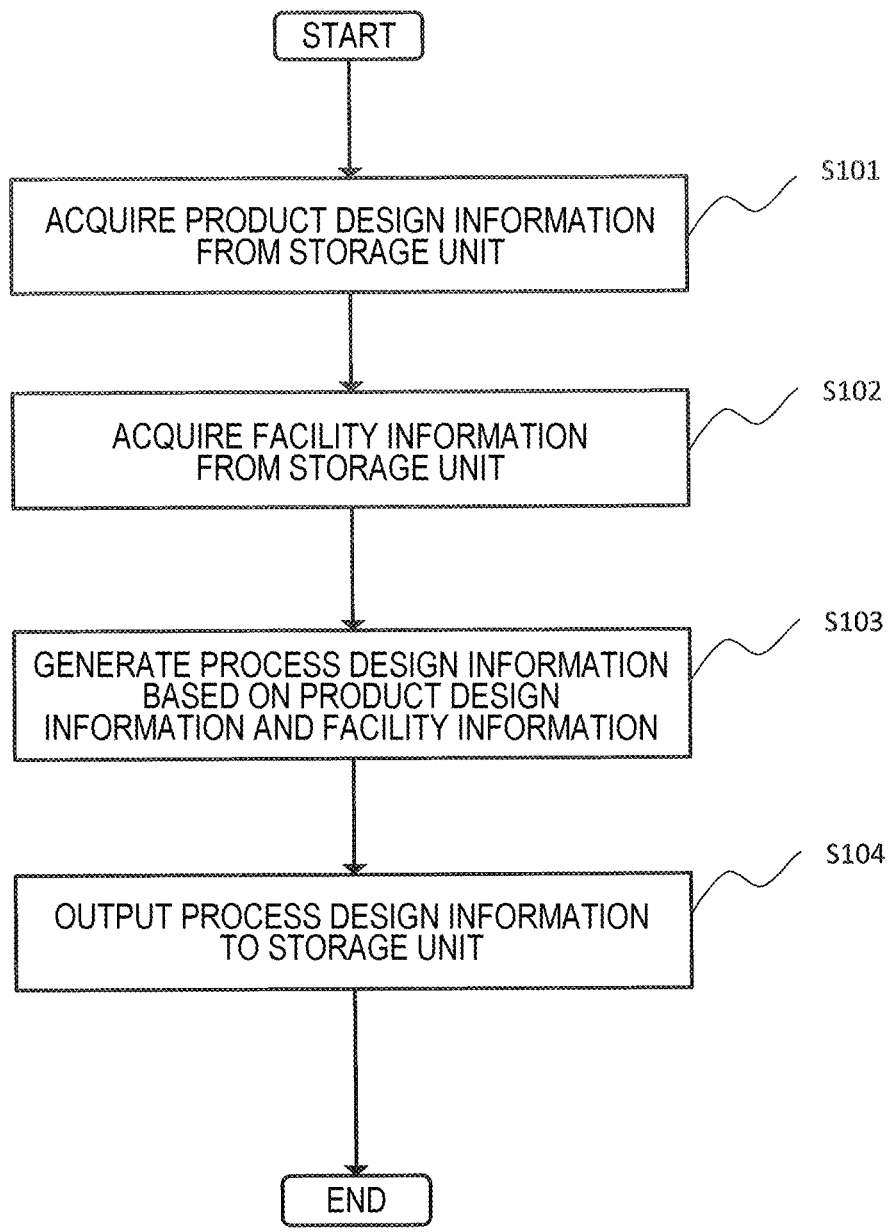
FIG. 3 is a flowchart illustrating a process of processing of a process design generation unit according to the embodiment of the present invention.

FIG. 3 is a flowchart illustrating a process of processing of the process design generation unit 20 according to the embodiment of the present invention.

Details of the process design generation processing in Step S100 will be described with reference to FIG. 3. As illustrated in FIG. 3, in Step S100, the process design generation unit 20 generates process design information on the basis of product design information stored in advance in the product design information storage unit 70 and facility information stored in the facility information storage unit 80.

First, in Step S101, the process design generation unit 20 acquires product design information from the product design information storage unit 70.

Here, an example in which electronic drawing information (for example, a 2D-CAD drawing or a 3D-CAD drawing) of a product is used for the product design information will be described. However, the design product information may be any information that can be used to identify a product, work, and the like necessary for manufacturing a product. The example of FIG. 3 does not limit the format of the product design information.

Next, in Step S102, the process design generation unit 20 acquires facility information from the facility information storage unit 80.

FIG. 4 is an explanatory diagram illustrating an example of facility information according to the embodiment of the present invention.

A facility information table 80*a*, which is an example of the facility information, includes a device name field 80*b*, a manufacturer field 80*c*, a power supply connection field 80*d*, a communication connection field 80*e*, a load capacity field 80*f*, an outer shape field 80*g*, and an operation speed field 80*h*.

The device name field 80*b* stores information identifying a device name by which a name of a device can be identified.

The manufacturer field 80*c* stores information identifying a manufacturer of a device identified in the device name field 80*b*.

The power supply connection field 80*d* stores information for identifying power supply connection specifications of a device identified in the device name field 80*b*.

The communication connection field 80*e* stores information for identifying communication connection specifications of a device identified in the device name field 80*b*.

The load capacity field 80*f* stores information for identifying load capacity specifications of a device identified in the device name field 80*b*.

The outer shape field 80*g* stores information for identifying outer shape size of a device identified in the device name field 80*b*.

The operation speed field 80*h* stores information for identifying an operation speed of a device identified in the device name field 80*b*.

In this facility information, specifications of power supply connection and communication connection of each device are described. For this reason, power supply and communication connection specifications of a device can also be described in line specifications (line configuration information) configured by a module to be described later. Further, as an operation speed and outer shape size of a device are described, work time of each piece of work and conveyance time between facilities can be calculated using this information. For this reason, it is possible to design a process in consideration of a line balance by repeating process division, facility assignment, and line balance calculation on the basis of the work time and the conveyance time. Further, as production capacity of a line, cycle time and lead time of a line can be calculated on the basis of the work time and the conveyance time.

In the above description, a manufacturer, power supply connection, communication connection, load capacity, an outer shape, and an operation speed are described as an example of specification information of a device. However, specification information (measurement accuracy, the number of stored components, and the like) necessary for automatic generation of a process design or conversion of line configuration information to be described later may be added to or deleted from the facility information. The example of FIG. 4 does not limit information to be entered as the facility information in the present invention.

Next, in Step S103, the process design generation unit 20 generates process design information (order of processes, and a device, a component, and the like used in a process) describing a process design of a line for producing a product on the basis of the product design information and the facility information.

Here, the process design information generation will be described as an example using existing software (such as computer-aided process planning) that generates a process design in which a line balance and production capacity of a line are optimized, but this does not limit a method of the process design information generation.

FIG. 5 is an explanatory diagram illustrating an example of the process design information according to the embodiment of the present invention.

A process design information table 130*a*, which is an example of the process design information, includes a process No field 130*b*, a work name field 130*c*, a component name field 130*d*, a robot field 130*e*, a tool field 130*f*, a component supply field 130*g*, a conveyance field 130*h*, a table field 130*i*, and an option field 130*j*.

The process No field 130*b* stores information for identifying a process No (number) by which process order of a product can be identified.

The work name field 130*c* stores information for identifying a name of work performed in a process identified in the process No field 130*b*.

The component name field 130*d* stores information for identifying a name of a component used in work identified in the work name field 130*c*.

The robot field 130*e* stores information for identifying a name of a robot used in work identified in the work name field 130*c*.

The tool field 130*f* stores information for identifying a name of a tool used in work identified in the work name field 130*c*.

The component supply field 130*g* stores information for identifying a name of a component supply machine used in work identified in the work name field 130*c*.

The conveyance field 130*h* stores information for identifying a name of a conveyance machine used in work identified in the work name field 130*c*.

The table field 130*i* stores information for identifying a name of a table used in work identified in the work name field 130*c*.

The option field 130*j* stores information for identifying a name of an optional device attached to a device used in work identified in the work name field 130*c*.

In this process design information, devices required in each process as described above are described separately for each function. By the above, when line specifications (line configuration information) configured by a module to be described later are generated, a module name and a type of a function necessary in each process can be automatically identified.

In the above description, a process No, a work name, a component name, a robot, a tool, component supply, conveyance, a table, and an option are described as a process design information example. However, necessary specification information (working time, production capacity, and the like) may be added to or deleted from the process design information. The example of FIG. 5 does not limit information to be entered in the process design information.

Next, in Step S104, the process design generation unit 20 outputs process design information to the process design storage unit 130.

After the above, execution of a flowchart of the process design generation processing ends.

<Line Configuration Module Conversion Unit>

In a second procedure illustrated in FIG. 2, the line configuration module conversion unit 30 converts the process design information into line configuration information described in units of modules (Step S200).

The line configuration module conversion unit 30 can automatically convert the process design information into the line configuration information in which physical connection specifications of each module described later, connection specifications on communication, and the like are described, and output the line configuration information. By the above, it is possible to determine whether modules can be connected to each other on the basis of specifications of physical connection, communication, and the like, so that it is possible to automatically determine whether or not module recombination can be performed. Further, since connection specifications are described in the line configuration information, it is not necessary for the user to investigate connection specifications and examine specifications, and it is possible to reduce man-hours for detailed design and design change at the time of actual line construction and recombination. For this reason, the user can realize quick line construction and recombination.

Here, the module will be described by exemplifying a unit of devices that perform a function (for performing direct work such as assembly, a tool, conveyance, component supply, and the like) in a manufacturing process as a single unit. Specific examples include a robot (an arm robot, the SCARA robot, or the like), a tool (a robot hand or the like), a conveyance device (a conveyor or the like), and a component supply device (a feeder, a component pallet, or the like). However, a specification method of the module only needs to be a method that is easy to handle in performing line recombination, and the above example does not limit a specification method of the module.

Figure 6:
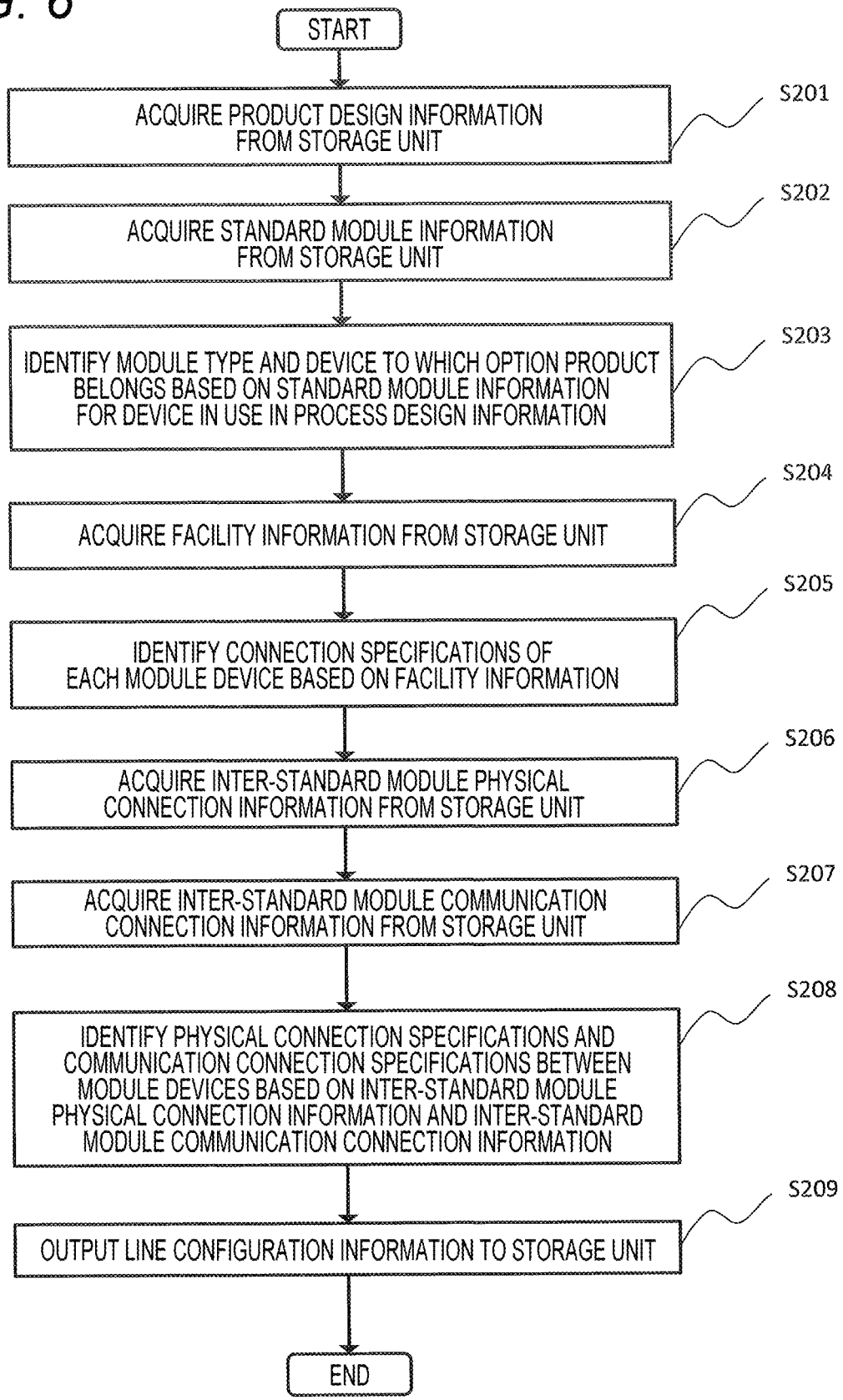
FIG. 6 is a flowchart illustrating a process of processing of a line configuration module conversion unit according to the embodiment of the present invention.

FIG. 6 is a flowchart illustrating a process of processing of the line configuration module conversion unit 30 according to the embodiment of the present invention.

Details of line configuration module conversion processing in Step S200 will be described with reference to FIG. 6. As illustrated in FIG. 6, in Step S200, the line configuration module conversion unit 30 converts the process design information into the line configuration information based on standard module information stored in the standard module information storage unit 90, inter-standard module physical connection information stored in the inter-standard module physical connection information storage unit 100, and inter-standard module communication connection information stored in the inter-standard module communication connection information storage unit 110.

First, in Step S201, the line configuration module conversion unit 30 acquires the process design information from the process design storage unit 130.

Next, in Step S202, the line configuration module conversion unit 30 acquires standard module information from the standard module information storage unit 90.

Figure 7:
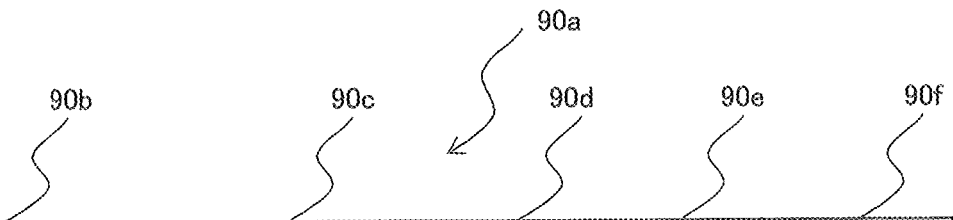
FIG. 7 is an explanatory diagram illustrating an example of standard module information according to the embodiment of the present invention.

FIG. 7 is an explanatory diagram illustrating an example of the standard module information according to the embodiment of the present invention.

A standard module information table 90a, which is an example of the standard module information, includes a module device name field 90b, a module type name field 90c, an Option 1 field 90d, an Option 2 field 90e, and an Option 3 field 90f.

The module device name field 90b stores information for identifying a name of a module device by which a device name used in a process can be identified.

The module type name field 90c stores information for identifying a type of a module of a device identified in the module device name field 90b.

The Option 1 field 90d stores information for identifying a name of a first accessory device attachable to a module of a device identified in the module device name field 90b.

The Option 2 field 90e stores information for identifying a name of a second accessory device attachable to a module of a device identified in the module device name field 90b.

The Option 3 field 90f stores information for identifying a name of a third accessory device attachable to a module of a device identified in the module device name field 90b.

This standard module information describes what type of module each device is classified into, and what option can be attached. By the above, at the time of generation of line configuration information to be described later, it is possible to automatically identify which module type corresponds to a device necessary for each process by browsing a module type of each device in this standard module information.

Here, as options that can be attached to each module device, three types, which are Option 1, Option 2, and Option 3, will be described as an example. However, in the standard module information, a column may be added if there are more options that can be attached, and information related to them may be entered. The example of FIG. 7 does not limit the number of options that can be entered in the standard module information.

Here, work will be described as an example using assembly work and conveyance work by a robot device, but the work may be performed by a worker, and a worker may also be classified as a module.

Next, in Step S203, the line configuration module conversion unit 30 refers to the standard module information and identifies a module type of a device described in the process design information and which device an option belongs.

Next, in Step S204, the line configuration module conversion unit 30 acquires the facility information from the facility information storage unit 80.

Next, in Step S205, the line configuration module conversion unit 30 refers to facility specifications, identifies a module type of a device described in the process design information, and identifies connection specifications of the device.

Next, in Step S206, the line configuration module conversion unit 30 acquires inter-standard module physical connection information from the inter-standard module physical connection information storage unit 100.

FIG. 8 is an explanatory diagram illustrating an example of the inter-standard module physical connection information according to the embodiment of the present invention.

An inter-standard module physical connection information table 100a, which is an example of the inter-standard module physical connection information, has a module type name field 100b, a device name field 100c, a robot field (second row: arm) 100d, a robot field (second row: SCARA) 100e, a tool field (second row: opening and closing hand) 100f, a tool field (second row: suction hand) 100g, a component supply field (second row: feeder) 100h, a conveyance field (second row: conveyor) 100i, an assembly table field (second row: automatic assembly table) 100j, an option field (second row: position sensor) 100k, and an option field (second row: camera) 100l.

The module type name field 100b stores information for identifying a name of a module type by which a module type can be identified.

The device name field 100c stores information for identifying a name of a device belonging to a module type identified in the module type name field 100b.

The robot field (second row: arm) 100d stores information for identifying a connection method in a case where a device identified in the module type name field 100b and the device name field 100c is physically connected to Device name: Arm described in the second row.

The robot field (second row: SCARA) 100e stores information for identifying a connection method in a case where a device identified in the module type name field 100b and the device name field 100c is physically connected to Device name: SCARA described in the second row.

The tool field (second row: opening and closing hand) 100f stores information for identifying a connection method in a case where a device identified in the module type name field 100b and the device name field 100c is physically connected to Device name: Opening and closing hand described in the second row.

The tool field (second row: suction hand) 100g stores information for identifying a connection method in a case where a device identified in the module type name field 100b and the device name field 100c is physically connected to Device name: Suction hand described in the second row.

The component supply field (second row: feeder) 100h stores information for identifying a connection method in a case where a device identified in the module type name field 100b and the device name field 100c is physically connected to Device name: Feeder described in the second row.

The conveyance field (second row: conveyor) 100i stores information for identifying a connection method in a case where a device identified in the module type name field 100b and the device name field 100c is physically connected to Device name: Conveyor described in the second row.

The assembly table field (second row: automatic assembly table) 100j stores information for identifying a connection method in a case where a device identified in the module type name field 100b and the device name field 100c is physically connected to Device name: Automatic assembly table described in the second row.

The option field (second row: position sensor) 100k stores information for identifying a connection method in a case where a device identified in the module type name field 100b and the device name field 100c is physically connected to Device name: Position sensor described in the second row.

The option field (second row: camera) 100l stores information for identifying a connection method in a case where a device identified in the module type name field 100b and the device name field 100c is physically connected to Device name: Camera described in the second row.

This inter-standard module physical connection information describes how modules are physically connected to each other. When line configuration information to be described later is generated, connection specifications of each module in this inter-standard module physical connection information is browsed, so that it is possible to automatically identify which module each module is connected to in what physical specifications. Further, as the identified physical connection information is described in line configuration information to be described later, it is possible to reduce man-hours for detailed design and design change of device installation at the time of actual line construction and recombination.

Here, as a module type and a device, a robot (device name: arm, SCARA), a tool (device name: opening and closing hand, suction hand), component supply (device name: feeder), conveyance (device name: conveyor), an assembly table (device name: automatic assembly table), and an option (device name: position sensor, camera) will be described as an example. However, a module type and a device may be added to or deleted from the inter-standard module physical connection information. The example of FIG. 8 does not limit information to be entered in the inter-standard module physical connection information.

Next, in Step S207, the line configuration module conversion unit 30 acquires inter-standard module communication connection information from the inter-standard module communication connection information storage unit 110.

FIG. 9 is an explanatory diagram illustrating an example of the inter-standard module communication connection information according to the embodiment of the present invention.

The inter-standard module communication connection information table 110a, which is an example of the inter-standard module communication connection information, has a module type name field 110b, a device name field 110c, a robot field (second row: arm) 110d, a robot field (second row: SCARA) 110e, a tool field (second row: opening and closing hand) 110f, a tool field (second row: suction hand) 110g, a component supply field (second row: feeder) 110h, a conveyance field (second row: conveyor) 110i, an assembly table field (second row: automatic assembly table) 110j, an option field (second row: position sensor) 110k, and an option field (second row: camera) 110l.

The module type name field 110b stores information for identifying a name of a module type by which a module type can be identified.

The device name field 110c stores information for identifying a name of a device belonging to a module type identified in the module type name field 110b.

The robot field (second row: arm) 110d stores information for identifying a connection method in a case where a device identified in the module type name field 110b and the device name field 110c is connected by a signal line to Device name: Arm described in the second row.

The robot field (second row: SCARA) 110e stores information for identifying a connection method in a case where a device identified in the module type name field 110b and the device name field 110c is connected by a signal line to Device name: SCARA described in the second row.

The tool field (second row: opening and closing hand) 110f stores information for identifying a connection method in a case where a device identified in the module type name field 110b and the device name field 110c is connected by a signal line to Device name: Opening and closing hand described in the second row.

The tool field (second row: suction hand) 110g stores information for identifying a connection method in a case where a device identified in the module type name field 110b and the device name field 110c is connected by a signal line to Device name: Suction hand described in the second row.

The component supply field (second row: feeder) 110h stores information for identifying a connection method in a case where a device identified in the module type name field 110b and the device name field 110c is connected by a signal line to Device name: Feeder described in the second row.

The conveyance field (second row: conveyor) 110i stores information for identifying a connection method in a case where a device identified in the module type name field 110b and the device name field 110c is connected by a signal line to Device name: Conveyor described in the second row.

The assembly table field (second row: automatic assembly table) 110j stores information for identifying a connection method in a case where a device identified in the module type name field 110b and the device name field 110c is connected by a signal line to Device name: Automatic assembly table described in the second row.

The option field (second row: position sensor) 110k stores information for identifying a connection method in a case where a device identified in the module type name field 110b and the device name field 110c is connected by a signal line to Device name: Position sensor described in the second row.

The option field (second row: camera) 110l stores information for identifying a connection method in a case where a device identified in the module type name field 110b and the device name field 110c is connected by a signal line to Device name: Camera described in the second row.

This inter-standard module communication connection information describes how modules are connected to each other in communication. When line configuration information to be described later is generated, connection specifications of each module in this inter-standard module communication connection information is browsed, so that it is possible to automatically identify which module each module is connected to in what communication specifications. Further, as the identified communication connection information is described in line configuration information to be described later, it is possible to reduce man-hours for detailed design and design change of communication wiring at the time of actual line construction and recombination.

Here, as a module type and a device, a robot (device name: arm, SCARA), a tool (device name: opening and closing hand, suction hand), component supply (device name: feeder), conveyance (device name: conveyor), an assembly table (device name: automatic assembly table), and an option (device name: position sensor, camera) will be described as an example. However, a module type and a device may be added to or deleted from the inter-standard module communication connection information. The example of FIG. 9 does not limit information to be entered in the inter-standard module communication connection information.

Next, in Step S208, the line configuration module conversion unit 30 refers to the inter-standard module physical connection information and the inter-standard module communication connection information, and identifies a physical connection destination module, a physical connection method, a communication connection destination module, and a communication connection method of each device.

Next, in Step S209, the line configuration module conversion unit 30 outputs line configuration information to the line configuration information storage unit 140.

FIG. 10 is an explanatory diagram illustrating an example of the line configuration information for one process according to the embodiment of the present invention.

The line configuration information table 140a, which is an example of the line configuration information for one process, includes a module type name field 140b, a module model name field 140c, an option field 140d, a module physical connection destination field 140e, a physical connection field 140f, a module communication connection destination field 140g, a communication connection field 140h, a power supply connection field 140i, a change software field 140j, a load capacity field 140k, and an outer shape field 140l.

The module type name field 140b stores information for identifying a name of a module type by which a module type can be identified.

The module model name field 140c stores information for identifying a name of a device belonging to a module type identified in the module type name field 140b.

The option field 140d stores information on a name of a device attached to a module device identified in the module type name field 140b and the module model name field 140c.

The module physical connection destination field 140e stores information on a name of a module device to which a device identified in the module type name field 140b and the module model name field 140c is physically connected.

The physical connection field 140f stores information on physical connection specifications in a case where a device identified in the module type name field 140b and the module model name field 140c is physically connected to a device identified in the module physical connection destination field 140e.

The module communication connection destination field 140g stores information on a name of a device to which a device identified in the module type name field 140b and the module model name field 140c is connected by a signal line.

The communication connection field 140h stores information on communication connection specifications in a case where a device identified in the module type name field 140b and the module model name field 140c is connected by a signal line to a device identified in the module communication connection destination field 140g.

The power supply connection field 140i stores information on power supply connection specifications of a device identified in the module type name field 140b and the module model name field 140c.

The change software field 140j stores information on a name of software that needs to be changed in a device identified in the module type name field 140b and the module model name field 140c.

The load capacity field 140k stores information on load capacity specifications of a device identified in the module type name field 140b and the module model name field 140c.

The outer shape field 140l stores information on outer shape specifications of a device identified in the module type name field 140b and the module model name field 140c.

This line configuration information describes what type of module each process of a line is configured by. Further, the line configuration information describes how each module is connected physically, by communication, and to power supply. As each piece of connection information is described in this manner, it is possible to reduce man-hours for detailed design and design change of each connection portion at the time of actual line construction and recombination.

Further, in the line configuration information, information on a module constituting a line may be managed for each hierarchy to which each module belongs. In the example of FIG. 10, a tool (for example, a robot hand or the like) belongs to a hierarchy one level lower than a hierarchy to which a robot belongs, and a module (for example, a feeder or the like) for supplying a component belongs to a hierarchy still one level lower than the hierarchy. As management for each hierarchy is performed in this manner, it is easy to generate the line configuration information reflecting a change in a module such as, for example, a robot is replaced with another robot belonging to the same hierarchy or an opening and closing hand is replaced with a suction hand belonging to the same hierarchy, and it is possible to reduce man-hours for design change of each connection portion at the time of line recombination.

Here, the specification information of a device will be described as an example using load capacity and an outer shape. However, necessary specification information (operation accuracy, the number of stored components, a component conveyance path, and the like) may be added to or deleted from the line configuration information. The example of FIG. 10 does not limit specification information to be entered in the line configuration information.

After the above, the execution of the flowchart of the line configuration module conversion processing ends.

<Line Configuration Editing Unit>

In a third procedure illustrated in FIG. 2, the line configuration editing unit 40 displays the line configuration information on a screen, and edits the line configuration information based on a line configuration edited on the screen (Step S300).

The line configuration editing unit 40 allows the user to easily check a current line configuration and an available module on a screen. Further, the user does not need to manually rewrite a document or data in which a line configuration is described, and can easily recombine a line by screen operation. Then, through a step of automatic processing described later, the user can quickly acquire change specifications necessary for recombining an actual line as the line configuration information described above.

Figure 11:
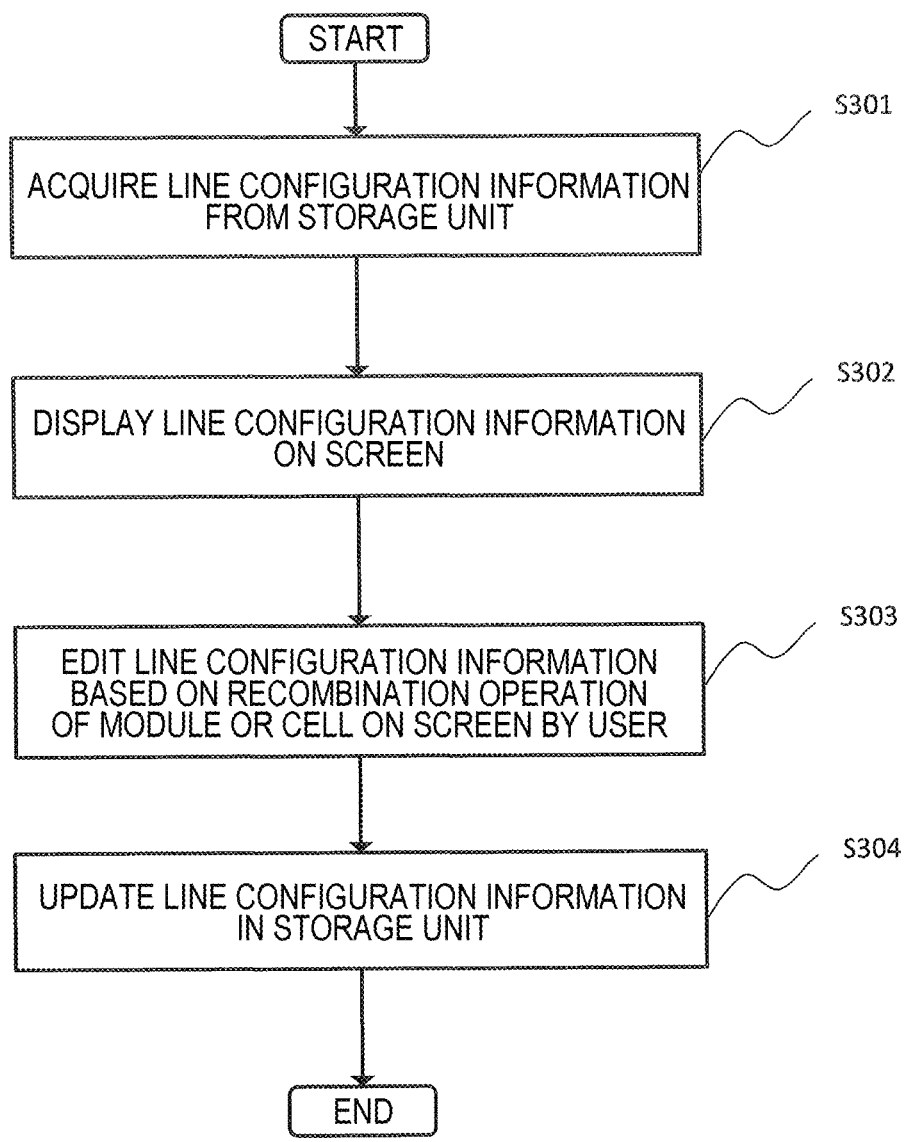
FIG. 11 is a flowchart illustrating a process of processing of a line configuration editing unit according to the embodiment of the present invention.

FIG. 11 is a flowchart illustrating a process of processing of the line configuration editing unit 40 according to the embodiment of the present invention.

Details of line configuration editing processing in Step S300 will be described with reference to FIG. 11.

First, in Step S301, the line configuration editing unit 40 acquires the line configuration information from the line configuration information storage unit 140, and copies the line configuration information to the pre-edit line configuration information storage unit 150.

Next, in Step S302, the line configuration editing unit 40 displays the line configuration information on the screen display device 190 connected to the communication unit 60.

Figure 12:
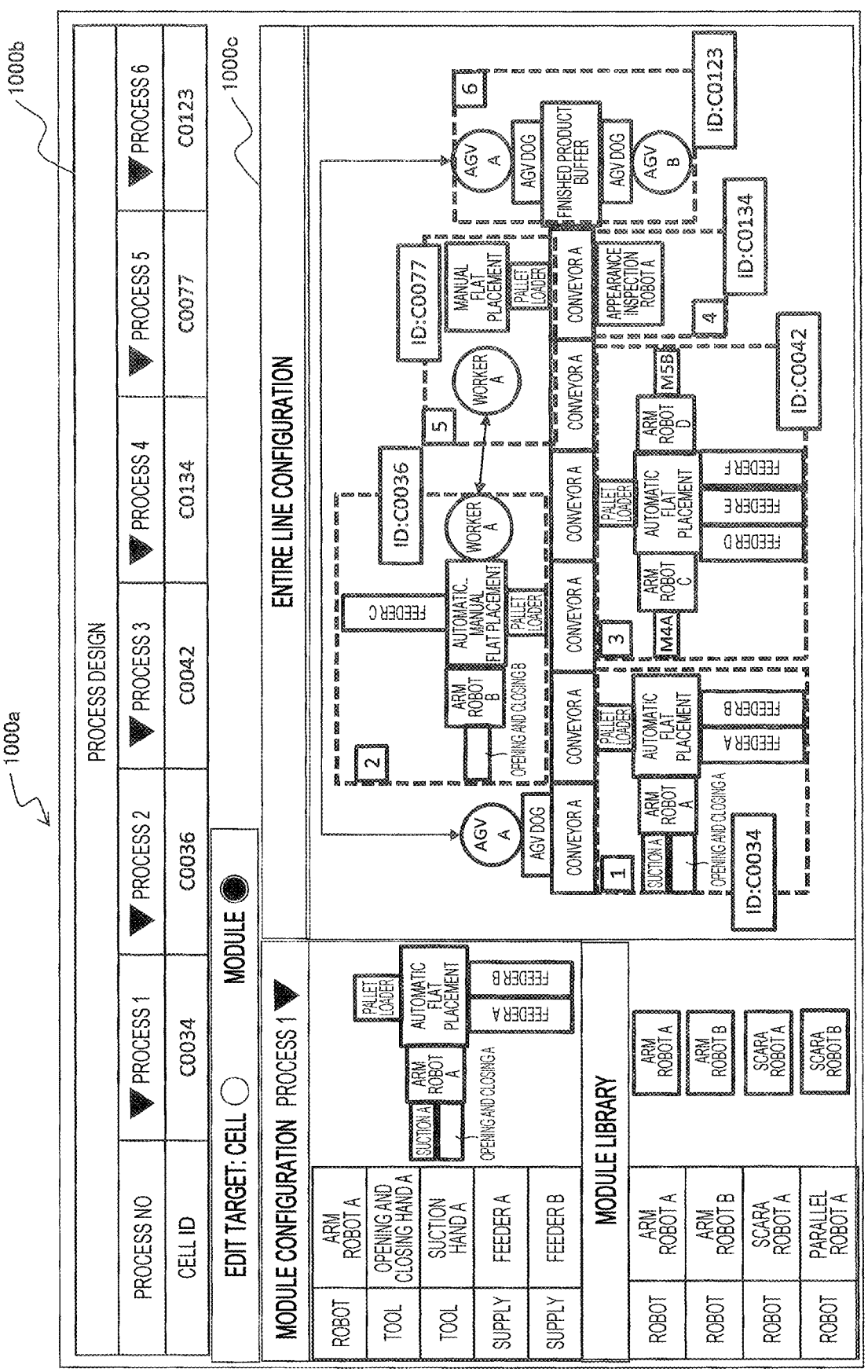
FIG. 12 is an explanatory diagram illustrating an example of a display screen of the line configuration information according to the embodiment of the present invention.

FIG. 12 is an explanatory diagram illustrating an example of a display screen of the line configuration information according to the embodiment of the present invention.

A schematic diagram 1000a which is an example of a display screen of the line configuration information has a display area 1000b of process information constituting a line and a display area 1000c of a module device configuration of a certain process.

The screen displays a library of modules that can be used for recombination, a current line, and a module configuration of each process. The user selects a module from the library in accordance with a change in work content, a production amount, production facility resources, and the like, and performs recombination with a module of a current line configuration. Alternatively, the user may add or delete a module. Examples include adding an arm robot which is a robot module in order to increase a production amount, changing a conveyor to a self-supporting movable truck as a conveyance module due to a conveyor failure, changing an opening and closing hand to a suction hand as a tool module in order to change a component assembling method, and the like.

Here, as a shape of a module device, an example using a block figure is illustrated. However, a picture or a three-dimensional model of a device may be displayed, and the example of FIG. 12 does not limit a screen display method of a module device.

Further, in the example of FIG. 12, physical connection between modules is displayed by a positional relationship of a figure indicating each module (specifically, in a manner indicating that adjacent modules are physically connected). However, such a display method is an example, and various other display methods may be applied. For example, by connecting figures by a line, connection of the figures may be displayed. Further, a communication connection may be displayed in a similar manner. Display of a physical connection and display of a communication connection may be switched according to an instruction of the user, or may be performed simultaneously. In a case of simultaneous display, a physical connection and a communication connection may be displayed in different modes (for example, with lines of different colors).

Further, as illustrated in FIG. 10, in a case where modules constituting a line are managed for each hierarchy, a module device may be displayed so that a hierarchy to which each module belongs can be visually recognized. For example, a figure or the like having a predetermined color, a predetermined tone, a predetermined shape, or the like may be displayed for each hierarchy, or a numerical value, a symbol, or the like for identifying a hierarchy may be displayed. The same applies to FIG. 13 described later.

Next, in Step S303, the line configuration editing unit 40 performs editing to rewrite a module device constituting a process in the line configuration information in accordance with recombination operation of a module or a cell on a screen by the user using a screen operation device connected to the communication unit 60. Here, manual recombination by the user is described as an example of a method of editing a line configuration. However, according to the embodiment, automatic editing may be performed using existing software that optimizes a line balance and production capacity, and the above example does not limit the editing method.

Figure 13:
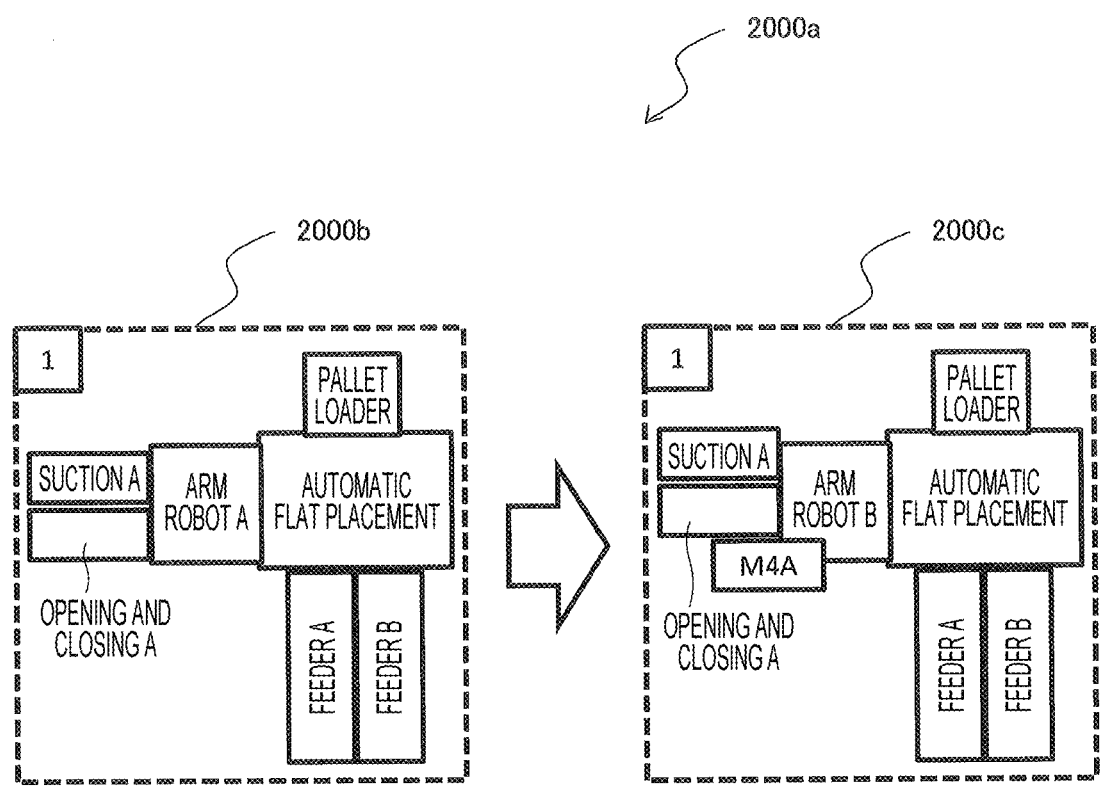
FIG. 13 is an explanatory diagram illustrating an example of editing of the line configuration information on a screen according to the embodiment of the present invention.

FIG. 13 is an explanatory diagram illustrating an example of editing of the line configuration information on a screen according to the embodiment of the present invention.

An example 2000a obtained by editing the line configuration information on a screen includes a configuration diagram 2000b of Process 1 before line editing and a configuration diagram 2000c of Process 1 after line editing. In the configuration of the configuration diagram 2000b, an arm robot A module is changed to an arm robot B module by editing performed on a screen by the user, and an M5 driver A module is added in contrast to the configuration of the configuration diagram 2000b.

In the present description, the line configuration information is edited, but the execution of the flowchart (Step S300) may be ended when the editing is unnecessary.

Next, in Step S304, the line configuration editing unit 40 updates the edited line configuration information in the line configuration information storage unit 140.

After the above, the execution of the flowchart of the line configuration editing processing ends.

<Line Configuration Software Changing Unit>

In a fourth procedure illustrated in FIG. 2, the line configuration software changing unit 50 changes software in accordance with edited line configuration information, and writes a changed portion in the line configuration information (Step S400).

The line configuration software changing unit 50 can automatically change software that needs to be changed by line recombination. For this reason, it is possible to reduce man-hours of software change work accompanying line recombination of the user.

Figure 14:
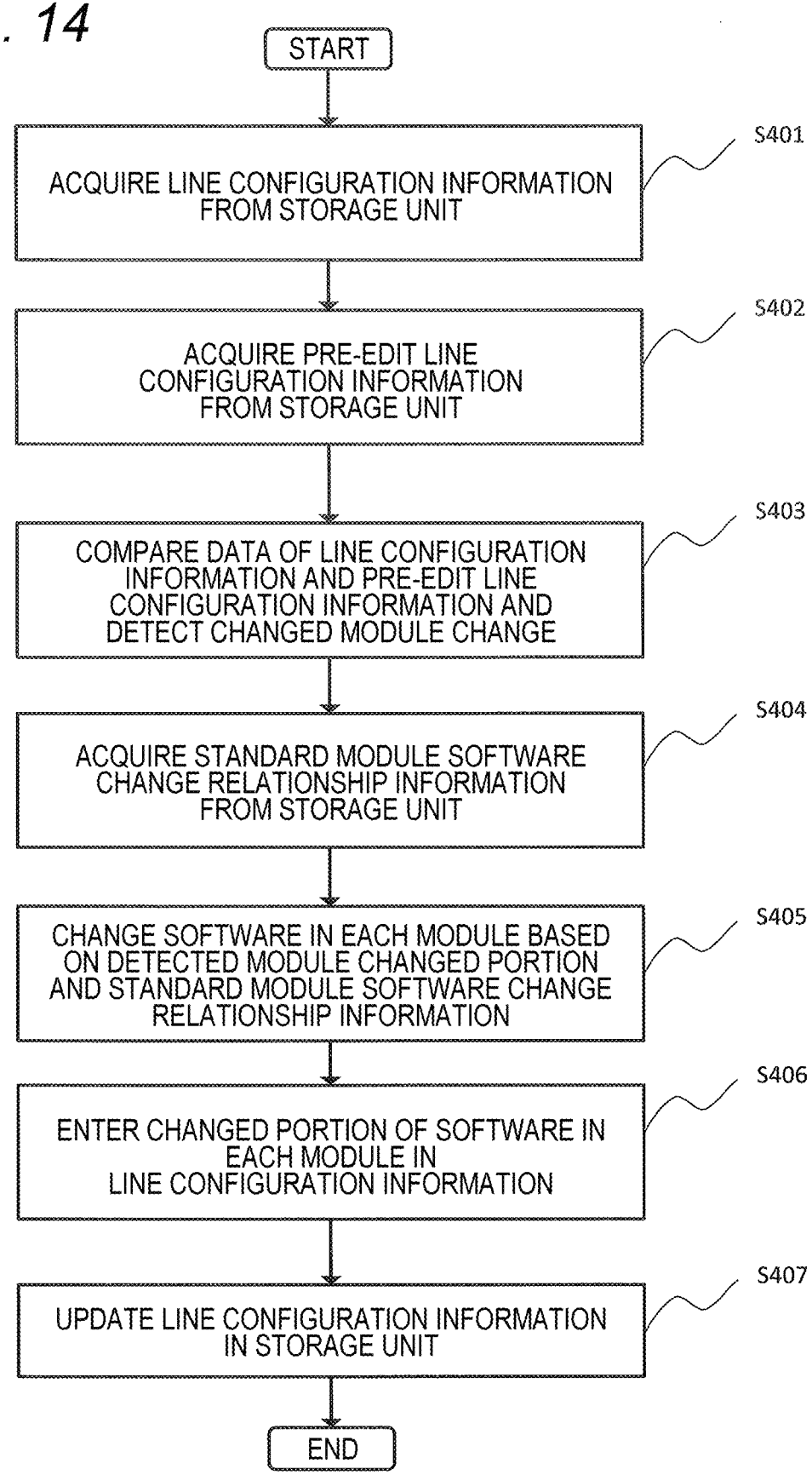
FIG. 14 is a flowchart illustrating a process of processing of a line configuration software conversion unit according to the embodiment of the present invention.

FIG. 14 is a flowchart illustrating a process of processing of the line configuration software changing unit 50 according to the embodiment of the present invention.

Details of line configuration software change processing in Step S400 will be described with reference to FIG. 14. In the line configuration software change processing, the line configuration software changing unit 50 changes software of a portion requiring software change on the basis of standard module software change relationship information stored in the standard module software change relationship information storage unit 120, the line configuration information stored in the line configuration information storage unit 140, and pre-edit line configuration information stored in the pre-edit line configuration information storage unit 150, and enters a changed portion in the line configuration information.

First, in Step S401, the line configuration software changing unit 50 acquires the line configuration information from the line configuration information storage unit 140.

Next, in Step S402, the line configuration software changing unit 50 acquires the pre-edit line configuration information from the pre-edit line configuration information storage unit 150.

Next, in Step S403, the line configuration software changing unit 50 compares the line configuration information with the pre-edit line configuration information, and detects a changed module.

Next, in Step S404, the line configuration software changing unit 50 acquires the standard module software change relationship information from the standard module software change relationship information storage unit 120.

FIG. 15 is an explanatory diagram illustrating an example of the standard module software change relationship information according to the embodiment of the present invention.

A standard module software change relationship information table 150*a*, which is an example of the standard module software change relationship information, has a module type name field 150*b*, a device name field 150*c*, a robot field (second row: arm) 150*d*, a robot field (second row: SCARA) 150*e*, a tool field (second row: opening and closing hand) 150*f*, a tool field (second row: suction hand) 150*g*, a component supply field (second row: feeder) 150*h*, a conveyance field (second row: conveyor) 150*i*, an assembly table field (second row: automatic assembly table) 150*j*, an option field (second row: position sensor) 150*k*, and an option field (second row: camera) 150*l*.

The module type name field 150*b* stores information for identifying a name of a module type by which a module type can be identified.

The device name field 150*c* stores information for identifying a name of a device belonging to a module type identified in the module type name field 150*b*.

The robot field (second row: arm) 150*d* stores information for identifying a program to be changed in an arm device in a case where a device identified in the module type name field 150*b* and the device name field 150*c* is changed in the line configuration information and Device name: Arm described in the second row is present in the line configuration information.

The robot field (second row: SCARA) 150*e* stores information for identifying a program to be changed in a SCARA device in a case where a device identified in the module type name field 150*b* and the device name field 150*c* is changed in the line configuration information and Device name: SCARA described in the second row is present in the line configuration information.

The tool field (second row: opening and closing hand) 150*f* stores information for identifying a program to be changed in an opening and closing hand device in a case where a device identified in the module type name field 150*b* and the device name field 150*c* is changed in the line configuration information and Device name: Opening and closing hand described in the second row is present in the line configuration information.

The tool field (second row: suction hand) 150*g* stores information for identifying a program to be changed in a suction hand device in a case where a device identified in the module type name field 150*b* and the device name field 150*c* is changed in the line configuration information and Device name: Suction hand described in the second row is present in the line configuration information.

The component supply field (second row: feeder) 150*h* stores information for identifying a program to be changed in a feeder device in a case where a device identified in the module type name field 150*b* and the device name field 150*c* is changed in the line configuration information and Device name: Feeder described in the second row is present in the line configuration information.

The conveyance field (second row: conveyor) 150*i* stores information for identifying a program to be changed in a conveyor device in a case where a device identified in the module type name field 150*b* and the device name field 150*c* is changed in the line configuration information and Device name: Conveyor described in the second row is present in the line configuration information.

The assembly table field (second row: automatic assembly table) 150*j* stores information for identifying a program to be changed in an automatic assembly table device in a case where a device identified in the module type name field 150*b* and the device name field 150*c* is changed in the line configuration information and Device name: Automatic assembly table described in the second row is present in the line configuration information.

The option field (second row: position sensor) 150*k* stores information for identifying a program to be changed in a position sensor device in a case where a device identified in the module type name field 150*b* and the device name field 150*c* is changed in the line configuration information and Device name: Position sensor described in the second row is present in the line configuration information.

The option field (second row: camera) 150*l* stores information for identifying a program to be changed in a camera device in a case where a device identified in the module type name field 150*b* and the device name field 150*c* is changed in the line configuration information and Device name: Camera described in the second row is present in the line configuration information.

In this standard module software change relationship information, software that needs to be changed when each module is changed is described. At the time of line recombination, by browsing software change specifications of a module to be recombined in this standard module software change relationship information, software that needs to be changed can be identified, and software change can be automatically performed in a step described later. For this reason, it is possible to reduce man-hours of software change work accompanying line recombination.

Here, as a module type and a device, a robot (device name: arm, SCARA), a tool (device name: opening and closing hand, suction hand), component supply (device name: feeder), conveyance (device name: conveyor), an assembly table (device name: automatic assembly table), and an option (device name: position sensor, camera) will be described as an example. However, a module type and a device may be added to or deleted from the standard module software change relationship information. FIG. 15 does not limit information to be entered in the standard module software change relationship information. For example, information regarding software that needs to be changed when a driver module attached to an arm robot is changed may be added.

For example, as illustrated in FIG. 13, in a case where an arm robot A is changed to an arm robot B, by referring to a third row, in which the module type name field 150b is Robot and the device name field 150c is Arm, in the robot field (second row: arm) 150d, changing a robot program is identified to be necessary. Further, as illustrated in FIG. 13, in a case where a driver module is further added to the arm robot B, by referring to a row (omitted in FIG. 15, in which the module type name field 150b is Tool and the device name field 150c is Driver, in the robot field (second row: arm) 150d, a program (for example, a robot program) that needs to be changed is identified. A program that is identified as described above is registered in the change software field 140j of the line configuration information table 140a.

Next, in Step S405, the line configuration software changing unit 50 refers to the standard module software change relationship information, identifies a software change portion and a changed software name of a device, and changes software.

Here, automatic generation of software based on information on specifications of a changed module or replacement with software prepared in advance will be described as an example of the change of software. However, the software may be changed by other methods. The above example does not limit the software changing method.

Next, in Step S406, the line configuration software changing unit 50 identifies a row in which the identified device is described using the module type name field 140b and the module model name field 140c in the line configuration information storage unit 140, and enters the identified changed software name in the change software field 140j.

Next, in Step S407, the line configuration software changing unit 50 updates the line configuration information in which the changed software name is written in the line configuration information storage unit 140.

After the above, the execution of the flowchart of the line configuration software change processing ends.

According to the embodiment described above, it is possible to reduce line design man-hours at the time of line construction and reconstruction by making it possible to describe and change a line configuration in units of modules.

Although the present invention is specifically described based on the embodiment, the present invention is not limited to the above-described embodiment of the invention, and it goes without saying that the line designing device can be changed without departing from the gist of the present invention.

Further, the system in the embodiment of the present invention may be configured as described below.

(1) A line designing device (for example, the line designing device 10) including a calculation unit (for example, the calculation unit 170) and a storage unit (for example, the storage unit 180), in which the storage unit holds facility information (for example, the facility information table 80a) indicating a specification of each module, process design information (for example, the process design information table 130a) indicating a component for manufacturing a product, work on the component, and a module used for the work, standard module information (for example, the standard module information table 90a) indicating a type of each of the modules and another module attachable to the module, and inter-module connection information (for example, one or both of the inter-standard module physical connection information table 100a and the inter-standard module communication connection information table 110a) indicating a connection specification between the modules, the module includes at least one of a facility and a device used for the work, and the calculation unit generates line configuration information (for example, the line configuration information table 140a) identifying the module constituting a manufacturing line for manufacturing the product and connection between the modules based on the facility information, the process design information, the standard module information, and the inter-module connection information (for example, Step S200), and outputs information (for example, information for displaying the schematic diagram 1000a as an example of a display screen of the line configuration information) indicating a module constituting the manufacturing line and connection between the modules based on the line configuration information (for example, Steps S301 and S302).

By the above, a line configuration can be described in units of modules, and line design man-hours at the time of line construction can be reduced.

(2) In above (1), the calculation unit outputs information for displaying each of the modules constituting the manufacturing line by a predetermined image (for example, a block figure, a photograph or a three-dimensional model of a device, and the like) and displaying connection between the modules by connection between the images, and changes the line configuration information so that change in the module or change in connection between the modules corresponding to operation on the image is reflected in a case where the operation is input (for example, Steps S303 and S304).

By the above, a line configuration can be changed in units of modules, and line design man-hours at the time of line reconstruction can be reduced.

(3) Information for identifying the module and information for identifying connection between the module and another module are managed for each hierarchy corresponding to a type of the module in the line configuration information of above (1), and, in a case where any of the modules included in the line configuration information is changed, the calculation unit replaces the module with a module in a same hierarchy as the module.

By the above, man-hours for design change of each connection portion at the time of line recombination can be reduced.

(4) In above (1), the storage unit further holds product design information (for example, information stored in the product design information storage unit 70) indicating a design of the product, and the calculation unit generates the process design information based on the product design information and the facility information (for example, Step S100).

By the above, process design man-hours of the user can be reduced.

(5) In above (1), the inter-module connection information includes information (for example, the inter-standard module physical connection information table 100a) for identifying a specification of physical connection between the modules, and the calculation unit generates the line configuration information including a specification of physical connection between the modules constituting the manufacturing line.

By the above, when the line configuration information is generated, it is possible to automatically identify that each module is connected to which module in what physical specifications. Further, it is possible to reduce man-hours for detailed design and design change of device installation at the time of actual line construction and recombination.

(6) In above (1), the inter-module connection information includes information (for example, the inter-standard module communication connection information table 110*a*) for identifying a specification of communication connection between the modules, and the calculation unit generates the line configuration information including a specification of communication connection between the modules constituting the manufacturing line.

By the above, when the line configuration information is generated, it is possible to automatically identify that each module is connected to which module in what communication specifications. Further, it is possible to reduce man-hours for detailed design and design change of communication wiring at the time of actual line construction and recombination.

(7) In above (1), the storage unit further holds software change information (for example, the standard module software change relationship information table 150*a*) for identifying a change in software required corresponding to the module to be changed in a case where the module constituting the manufacturing line is changed, and the calculation unit identifies the module to be changed by comparing the line configuration information before the module is changed with the module for which a change is input in a case where a change in the module constituting the manufacturing line is input (for example, Step S403), and changes software required corresponding to the identified module to be changed based on the software change information (for example, Steps S404 and S405).

By the above, it is possible to reduce man-hours of software change work accompanying recombination of a manufacturing line.

(8) In above (7), the module includes a robot, a device mounted on the robot, and a conveyance device that conveys a product, the software change information includes information indicating which one of a robot program and a ladder program is changed according to whether the module to be changed is the robot, the device mounted on the robot, or the conveyance device, and the calculation unit changes one of the robot program and the ladder program based on the software change information and the identified module to be changed.

By the above, it is possible to reduce man-hours of software change work accompanying recombination of a manufacturing line.

Note that the present invention is not limited to the above embodiment and includes a variety of variations. For example, the above embodiment is described in detail for better understanding of the present invention, and the present invention is not necessarily limited to an embodiment that includes all the configurations in the description. Further, a part of a configuration of a certain embodiment can be replaced with a configuration of another embodiment, and a configuration of a certain embodiment can be added to a configuration of another embodiment. Further, for a part of a configuration of each embodiment, other configurations can be added, removed, or replaced with.

Further, a part or the whole of the above configurations, functions, processing units, processing means, and the like may be obtained as hardware by way of, for example, designing them as an integrated circuit. The above configurations, functions, and the like may be realized by software by a processor interpreting and executing programs that perform functions of them. Information such as a program, a table, and a file for realizing each function can be stored in a storage device such as a non-volatile semiconductor memory, a hard disk drive, and a solid state drive (SSD), or a computer-readable non-transitory data storage medium such as an IC card, an SD card, and a DVD.

Further, a control line and an information line that are considered necessary for explanation are shown, and not all control lines or information lines on a product are necessarily shown. In practice, almost all configurations may be considered to be connected mutually.

The invention claimed is:

1. A line designing device comprising:
   a calculation unit; and
   a storage unit,
   wherein the storage unit holds facility information indicating a specification of each module, process design information indicating a component for manufacturing a product, work on the component, and a module used for the work, standard module information indicating a type of each of the modules and another module attachable thereto, and inter-module connection information indicating a connection specification between the modules,
   the module includes at least one of a facility and a device used for the work, and
   the calculation unit
   generates line configuration information identifying the module constituting a manufacturing line for manufacturing the product and connection between the modules based on the facility information, the process design information, the standard module information, and the inter-module connection information, and
   outputs information indicating a module constituting the manufacturing line and connection between the modules based on the line configuration information.

2. The line designing device according to claim 1, wherein
   the calculation unit
   outputs information for displaying each of the modules constituting the manufacturing line by a predetermined image and displaying connection between the modules by connection between the images, and
   changes the line configuration information so that change in the module or change in connection between the modules corresponding to operation on the image is reflected in a case where the operation is input.

3. The line designing device according to claim 1, wherein
   information for identifying the module and information for identifying connection between the module and another module are managed for each hierarchy corresponding to a type of the module in the line configuration information, and
   in a case where any of the modules included in the line configuration information is changed, the calculation unit replaces the module with a module in a same hierarchy as the module.

4. The line designing device according to claim 1, wherein
   the storage unit further holds product design information indicating a design of the product, and the calculation unit generates the process design information based on the product design information and the facility information.

5. The line designing device according to claim 1, wherein the inter-module connection information includes information for identifying a specification of physical connection between the modules, and
the calculation unit generates the line configuration information including a specification of physical connection between the modules constituting the manufacturing line.

6. The line designing device according to claim 1, wherein the inter-module connection information includes information for identifying a specification of communication connection between the modules, and
the calculation unit generates the line configuration information including a specification of communication connection between the modules constituting the manufacturing line.

7. The line designing device according to claim 1, wherein the storage unit further holds software change information for identifying a change in software required corresponding to the module to be changed in a case where the module constituting the manufacturing line is changed, and
the calculation unit
identifies the module to be changed by comparing the line configuration information before the module is changed with the module for which a change is input in a case where a change in the module constituting the manufacturing line is input, and
changes software required corresponding to the identified module to be changed based on the software change information.

8. The line designing device according to claim 7, wherein the module includes a robot, a device mounted on the robot, and a conveyance device that conveys a product,
the software change information includes information indicating which one of a robot program and a ladder program is changed according to whether the module to be changed is the robot, the device mounted on the robot, or the conveyance device, and
the calculation unit changes one of the robot program and the ladder program based on the software change information and the identified module to be changed.

9. A line designing method executed by a line designing device including a calculation unit and a storage unit,
the storage unit holding facility information indicating a specification of each module, process design information indicating a component for manufacturing a product, work on the component, and a module used for the work, standard module information indicating a type of each of the modules and another module attachable thereto, and inter-module connection information indicating a connection specification between the modules,
the module including at least one of a facility and a device used for the work,
the line designing method comprising the steps of:
generating, by the calculation unit, line configuration information identifying the module constituting a manufacturing line for manufacturing the product and connection between the modules based on the facility information, the process design information, the standard module information, and the inter-module connection information; and
outputting, from the calculation unit, information indicating a module constituting the manufacturing line and connection between the modules based on the line configuration information.

\* \* \* \* \*